United States Patent [19]
Tucker et al.

[11] Patent Number: 6,135,333
[45] Date of Patent: Oct. 24, 2000

[54] GAME CARRYING HUNTING PACK

[76] Inventors: Ronald Tucker, P.O. Box 1063; Mark O. Peterson, P.O. Box 551; Shaun H. Peterson, P.O. Box 826, all of Huntington Canyon, Utah 84528

[21] Appl. No.: 09/321,161

[22] Filed: May 27, 1999

[51] Int. Cl.[7] .................................................. A45F 3/04
[52] U.S. Cl. .................. 224/646; 224/609; 224/625; 224/651; 224/652; 224/654; 224/921; 224/931
[58] Field of Search .................................. 224/921, 646, 224/609, 640, 931, 625, 651, 652, 654, 242, 245, 42.11, 250

[56] References Cited

U.S. PATENT DOCUMENTS

| | | | |
|---|---|---|---|
| 1,426,024 | 8/1922 | Thureson | 2/94 |
| 2,948,899 | 8/1960 | Allen | 2/94 |
| 3,848,267 | 11/1974 | De Spain | 2/94 |
| 5,634,579 | 6/1997 | Baclawski | 224/646 |

*Primary Examiner*—Sue A. Weaver

[57] ABSTRACT

A game carrying hunting pack for carrying hunting supplies and game animal carcass on a user's upper body. The game carrying hunting pack includes flexible front and back panels each having upper and lower portions. A spaced apart pair of shoulder straps couple the upper portions of the front and back panels together. The front and back panels each have a main pouch coupled to the lower portion of the respective panel. The main pouches each have an upper edge defining an open top of the respective main pouch. The upper portion of the back panel has an elongate flexible securing strap coupled thereto for securing the antlers of a carcass held in the main pouch of the back panel.

8 Claims, 2 Drawing Sheets

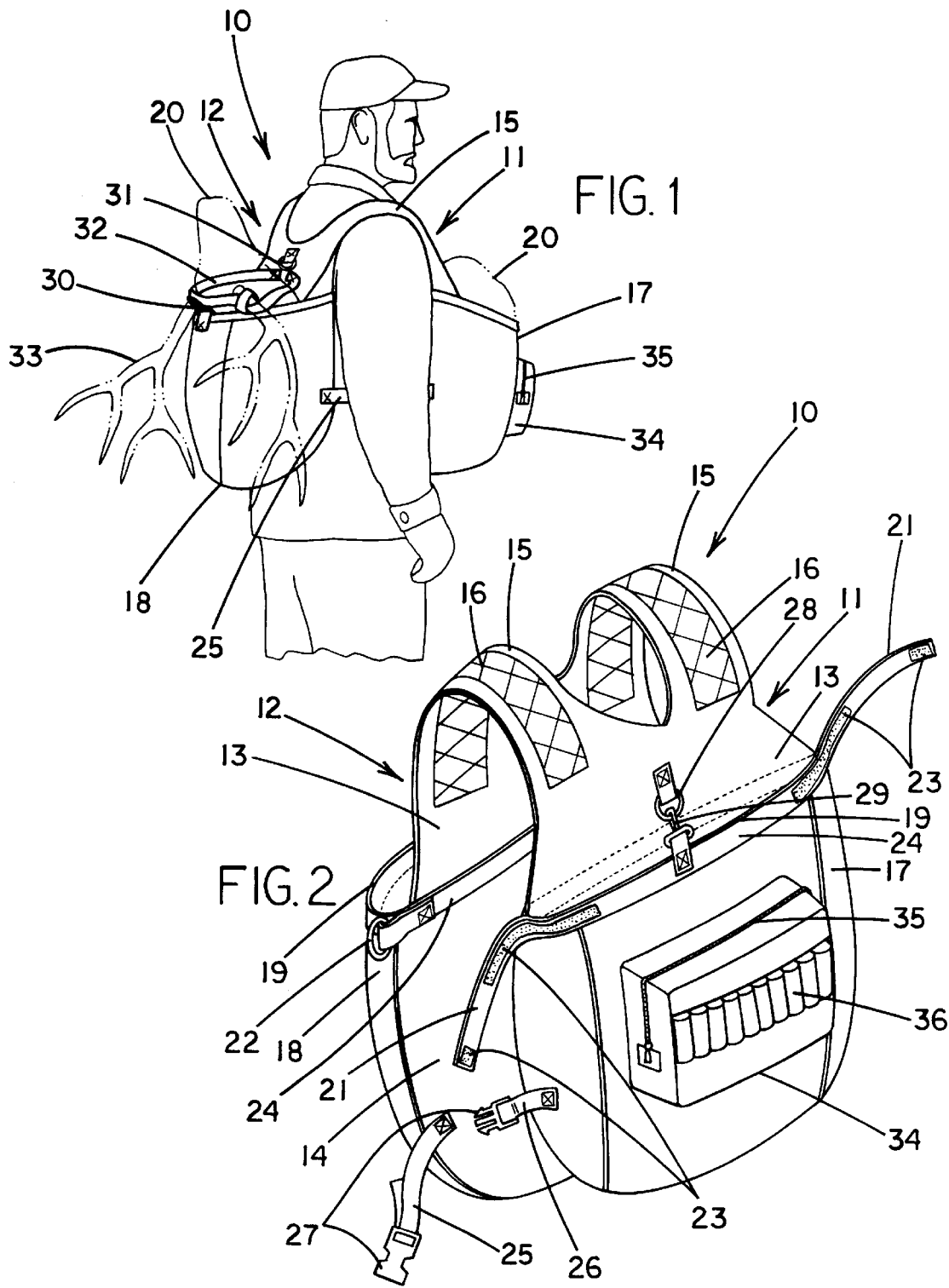

GAME CARRYING HUNTING PACK

BACKGROUND OF THE INVENTION

1. Field of the Invention

The present invention relates to hunting accessories and more particularly pertains to a new game carrying hunting pack for carrying hunting supplies and game animal carcass on a user's upper body.

2. Description of the Prior Art

The use of hunting accessories is known in the prior art. More specifically, hunting accessories heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,617,582; U.S. Pat. No. 4,778,091; U.S. Pat. No. 5,014,359; U.S. Pat. No. 5,586,703; U.S. Pat. No. 5,289,959; U.S. Pat. No. 4,600,134; and U.S. Pat. No. Des. 315,978.

While these devices fulfill their respective, particular objectives and requirements, the aforementioned patents do not disclose a new game carrying hunting pack. The inventive device includes flexible front and back panels each having upper and lower portions. A spaced apart pair of shoulder straps couple the upper portions of the front and back panels together. The front and back panels each have a main pouch coupled to the lower portion of the respective panel. The main pouches each have an upper edge defining an open top of the respective main pouch. The upper portion of the back panel has an elongate flexible securing strap coupled thereto for securing the antlers of a carcass held in the main pouch of the back panel.

In these respects, the game carrying hunting pack according to the present invention substantially departs from the conventional concepts and designs of the prior art, and in so doing provides an apparatus primarily developed for the purpose of carrying hunting supplies and game animal carcass on a user's upper body.

SUMMARY OF THE INVENTION

In view of the foregoing disadvantages inherent in the known types of hunting accessories now present in the prior art, the present invention provides a new game carrying hunting pack construction wherein the same can be utilized for carrying hunting supplies and game animal carcass on a user's upper body.

The general purpose of the present invention, which will be described subsequently in greater detail, is to provide a new game carrying hunting pack apparatus and method which has many of the advantages of the hunting accessories mentioned heretofore and many novel features that result in a new game carrying hunting pack which is not anticipated, rendered obvious, suggested, or even implied by any of the prior art hunting accessories, either alone or in any combination thereof.

To attain this, the present invention generally comprises flexible front and back panels each having upper and lower portions. A spaced apart pair of shoulder straps couple the upper portions of the front and back panels together. The front and back panels each have a main pouch coupled to the lower portion of the respective panel. The main pouches each have an upper edge defining an open top of the respective main pouch. The upper portion of the back panel has an elongate flexible securing strap coupled thereto for securing the antlers of a carcass held in the main pouch of the back panel.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new game carrying hunting pack apparatus and method which has many of the advantages of the hunting accessories mentioned heretofore and many novel features that result in a new game carrying hunting pack which is not anticipated, rendered obvious, suggested, or even implied by any of the prior art hunting accessories, either alone or in any combination thereof.

It is another object of the present invention to provide a new game carrying hunting pack which may be easily and efficiently manufactured and marketed.

It is a further object of the present invention to provide a new game carrying hunting pack which is of a durable and reliable construction.

An even further object of the present invention is to provide a new game carrying hunting pack which is susceptible of a low cost of manufacture with regard to both materials and labor, and which accordingly is then susceptible of low prices of sale to the consuming public, thereby making such game carrying hunting pack economically available to the buying public.

Still yet another object of the present invention is to provide a new game carrying hunting pack which provides in the apparatuses and methods of the prior art some of the advantages thereof, while simultaneously overcoming some of the disadvantages normally associated therewith.

Still another object of the present invention is to provide a new game carrying hunting pack for carrying hunting supplies and game animal carcass on a user's upper body.

Yet another object of the present invention is to provide a new game carrying hunting pack which includes flexible front and back panels each having upper and lower portions. A spaced apart pair of shoulder straps couple the upper portions of the front and back panels together. The front and back panels each have a main pouch coupled to the lower portion of the respective panel. The main pouches each have an upper edge defining an open top of the respective main pouch. The upper portion of the back panel has an elongate flexible securing strap coupled thereto for securing the antlers of a carcass held in the main pouch of the back panel.

Still yet another object of the present invention is to provide a new game carrying hunting pack that easily hauls big game out of rugged country such as forests and mountains.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side view of a new game carrying hunting pack on a user according to the present invention.

FIG. 2 is a schematic perspective view of the present invention.

DESCRIPTION OF THE PREFERRED EMBODIMENT

Figure 3:
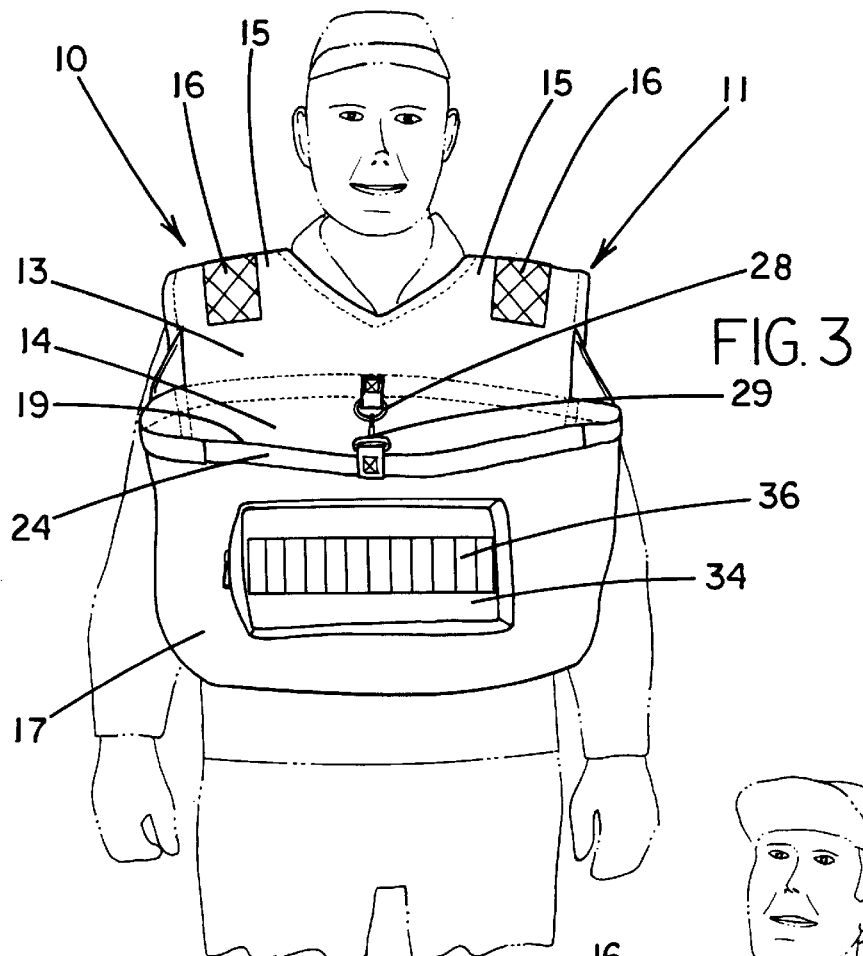
FIG. 3 is a schematic front view of the present invention.

With reference now to the drawings, and in particular to FIGS. 1 through 4 thereof, a new game carrying hunting pack embodying the principles and concepts of the present invention and generally designated by the reference numeral 10 will be described.

As best illustrated in FIGS. 1 through 4, the game carrying hunting pack 10 generally comprises flexible front and back panels each having upper and lower portions. A spaced apart pair of shoulder straps couple the upper portions of the front and back panels together. The front and back panels each have a main pouch coupled to the lower portion of the respective panel. The main pouches each have an upper edge defining an open top of the respective main pouch. The upper portion of the back panel has an elongate flexible securing strap coupled thereto for securing the antlers of a carcass held in the main pouch of the back panel.

In closer detail, the hunting pack 10 comprises flexible front and back panels 11,12 each having upper and lower portions 13,14. A spaced apart pair of shoulder straps 15,16 integrally couple the upper portions of the front and back panels together. The shoulder straps are designed for resting on a user's shoulders such that the front panel is position adjacent the user's chest and the back panel is positioned adjacent the user's back. The shoulder straps define a space therebetween for extending the user's head therethrough.

Preferably, the shoulder straps each have an elongate generally rectangular resilient deformable recoil pad 16 preferably embedded therein so that the recoil pads are each enclosed between a pair of layers of material forming the respective shoulder strap. Each of the recoil pads is preferably extended substantially across the respective shoulder straps between the upper portions of the front and back panels. In use, the recoil pads are designed for resting a butt of a firearm thereagainst for absorbing the recoil of the firearm when discharged. The recoil pads also provide additional comfort to the user's shoulders when wearing the hunting pack. In an ideal illustrative embodiment, the recoil pads each have a width of about 6 inches to provide sufficient padding to the most of the width of the respective shoulder strap for optimal user comfort.

The front and back panels each have a main pouch 17,18 coupled to the lower portion of the respective panel. The main pouches each have an upper edge 19 defining an open top of the respective main pouch. In use, the main pouches each is designed for carrying portions of a game animal carcass 20 therein. In particular, the main pouch of the front panel is preferably designed for holding the legs of the carcass while the main pouch of the back panel is preferably designed for holding the head and neck of the carcass. In an ideal illustrative embodiment, the main pouches of the front and back panels each have a horizontal width of about 20 inches and a vertical height between about 12 inches and about 14 inches to permit holding of the legs and head of a deer therein respectively.

The front panel preferably has a pair of elongate flexible upper side straps 21 outwardly extending from opposite sides of the front panel and spaced below the shoulder straps. In this preferred embodiment, the back panel has a pair of elongate flexible upper side loops 22 coupled to opposite sides of the back panel and spaced below the shoulder straps. The upper side straps are positioned adjacent the upper edge of the main pouch of the front panel and the upper side loops are positioned adjacent the upper edge of the main pouch of the back panel.

Each of the upper side straps is looped through an associated side loop to secure free ends of the upper side straps to the back panel so that the hunting pack is held in place on the user's torso. Preferably, the free ends of the upper side straps each are detachably attached to a midportion of the respective upper side strap by a hook and loop fastener 23.

Ideally, the front and back panels each has an annular reinforcing strap 24 coupled thereto along the upper edge of the main pouch of the respective panel and to a back face of the respective panel for providing reinforcement to the open tops of the main pouches for increasing the durability of the main pouches. In such an embodiment, the upper side straps and the side loops each are coupled to the associated reinforcing strap of the respective panel.

Even more preferably, the back panel further includes a pair of elongate flexible waist straps 25 outwardly extending from the opposite sides of the back panel and spaced below the upper side loops. In such a preferred embodiment, the front panel has a pair of elongate flexible lower connecting straps 26 coupled to opposite sides of the front panel and spaced below the upper side straps. The connecting straps ideally have lengths less than lengths of the waist straps.

Figure 4:
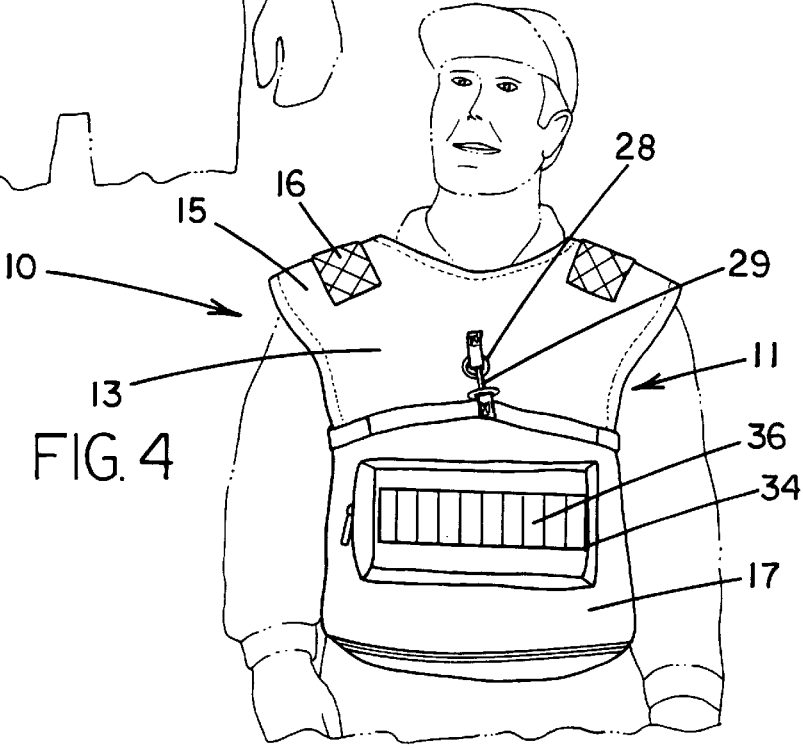
FIG. 4 is a schematic front view of the present invention with the waist straps secured to the connecting straps and tightened around the sides of the user's torso to hold the sides of the main pouches adjacent the sides of the user's torso.

Each waist strap has a free end detachably attached to a free end of an associated connecting strap by a quick release fastener 27. The waist straps and the connecting straps may be tightened around the sides of the user's torso to hold the sides of the main pouches adjacent the sides of the user's torso as illustrated in FIG. 4.

The upper edge of the main pouch of the front panel has a spring clip fastener 28 detachably coupling the upper edge of the main pouch of the front panel to a fastening loop 29 coupled to the upper portion of the front panel so that open top of the main pouch of the front panel is kept close to the front panel when the spring clip fastener is attached to the upper portion of the front panel. Similarly, the upper edge of the main pouch of the back panel has a spring clip fastener 30 detachably coupling the upper edge of the main pouch of the back panel to a fastening loop 31 coupled to the upper portion of the back panel so that open top of the main pouch of the back panel is kept close to the back panel when the spring clip fastener is attached to the upper portion of the back panel.

The upper portion of the back panel has an elongate flexible securing strap 32 coupled thereto below the fastening loop of the upper portion of the back panel. In use, the securing strap is designed for securing to the antlers 33 of a head of a game animal carcass in the main pouch of the back panel. Ideally, the securing strap may have a break therethrough dividing the securing strap into a pair of securing straps with free ends that may be attached to one another either by tying or a combination adjustable buckle and quick release fastener.

Preferably, a generally rectangular supply pouch 34 for carrying hunting supplies therein is coupled to the main pouch of the front panel. The supply pouch has a zippered upper slit 35 providing an closable opening into the supply pouch. In an ideal embodiment, the supply pouch has a height of about 5 inches, a horizontal width of about 10 inches for holding an optimal amount of hunting supplies therein. Ideally, a plurality of elastic cartridge loops 36 arranged in a row are coupled to a generally rectangular front face of the supply pouch. The cartridge loops are each designed for holding an ammunition cartridge therein such as rifle cartridges and shotgun shells in an easy to access location for the user of the hunting pouch.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A hunting pack, comprising:

flexible front and back panels each having upper and lower portions;

a spaced apart pair of shoulder straps coupling said upper portions of said front and back panels together;

said front and back panels each having a main pouch coupled to said lower portion of the respective panel, said main pouches each having an upper edge defining an open top of the respective main pouch;

said upper portion of said back panel having an elongate flexible securing strap coupled thereto; and said securing strap being adapted for securing to the antlers of a head of a game animal carcass in the main pouch of the back panel, wherein said securing strap has a break therethrough dividing said securing strap into a pair of securing straps with free ends that may be attached to one another.

2. The hunting pack of claim 1, wherein said shoulder straps each have a resilient deformable recoil pad extending between said upper portions of said front and back panels.

3. The hunting pack of claim 1, wherein said front panel has a pair of elongate flexible upper side straps outwardly extending from opposite sides of said front panel, wherein said back panel has a pair of elongate flexible upper side loops coupled to opposite sides of said back panel, wherein each of said upper side straps is looped through an associated side loop to secure free ends of said upper side straps to said back panel.

4. The hunting pack of claim 3, wherein said back panel has a pair of elongate flexible waist straps outwardly extending from said opposite sides of said back panel and spaced below said upper side loops, wherein said front panel has a pair of elongate flexible lower connecting straps coupled to opposite sides of said front panel and spaced below said upper side straps, wherein said connecting straps have lengths less than lengths of said waist straps, and wherein each waist strap has a free end detachably attached to a free end of an associated connecting strap.

5. The hunting pack of claim 1, wherein said upper edge of said main pouch of said front panel has a spring clip fastener detachably coupling said upper edge of said main pouch of said front panel to a fastening loop coupled to said upper portion of said front panel, and wherein said upper edge of said main pouch of said back panel has a spring clip fastener detachably coupling said upper edge of said main pouch of said back panel to a fastening loop coupled to said upper portion of said back panel.

6. The hunting pack of claim 1, further comprising a supply pouch being coupled to said main pouch of said front panel, said supply pouch having a zippered upper slit providing an closable opening into said supply pouch.

7. The hunting pack of claim 6, wherein a plurality of elastic cartridge loops are coupled to a generally rectangular front face of said supply pouch.

8. A hunting pack, comprising:

flexible front and back panels each having upper and lower portions;

a spaced apart pair of shoulder straps integrally coupling said upper portions of said front and back panels together;

said shoulder straps being adapted for resting on a user's shoulders such that said front panel is position adjacent the user's chest and said back panel is positioned adjacent the user's back, said shoulder straps defining a space therebetween for extending the user's head therethrough;

said shoulder straps each having an elongate generally rectangular resilient deformable recoil pad, each of said recoil pads being extended substantially across the respective shoulder straps between said upper portions of said front and back panels;

said front and back panels each having a main pouch coupled to said lower portion of the respective panel, said main pouches each having an upper edge defining an open top of the respective main pouch;

said front panel having a pair of elongate flexible upper side straps outwardly extending from opposite sides of said front panel;

said back panel having a pair of elongate flexible upper side loops coupled to opposite sides of said back panel;

said upper side straps being positioned adjacent said upper edge of said main pouch of said front panel, said upper side loops being positioned adjacent said upper edge of said main pouch of said back panel;

each of said upper side straps being looped through an associated side loop to secure free ends of said upper side straps to said back panel;

said back panel having a pair of elongate flexible waist straps outwardly extending from said opposite sides of said back panel and spaced below said upper side loops;

said front panel having a pair of elongate flexible lower connecting straps coupled to opposite sides of said front panel and spaced below said upper side straps;

said connecting straps having lengths less than lengths of said waist straps;

each waist strap having a free end detachably attached to a free end of an associated connecting strap;

said upper edge of said main pouch of said front panel having a spring clip fastener detachably coupling said upper edge of said main pouch of said front panel to a fastening loop coupled to said upper portion of said front panel;

said upper edge of said main pouch of said back panel having a spring clip fastener detachably coupling said upper edge of said main pouch of said back panel to a fastening loop coupled to said upper portion of said back panel;

said upper portion of said back panel having an elongate flexible securing strap coupled thereto below said fastening loop of said upper portion of said back panel;

a generally rectangular supply pouch being coupled to said main pouch of said front panel, said supply pouch having a zippered upper slit providing an closable opening into said supply pouch; and a plurality of elastic cartridge loops being coupled to a generally rectangular front face of said supply pouch.

* * * * *